April 7, 1964 L. W. JACOBS ETAL 3,128,142
CABLE CONNECTOR FOR PLUG-IN PANEL
Filed March 29, 1962 2 Sheets-Sheet 2
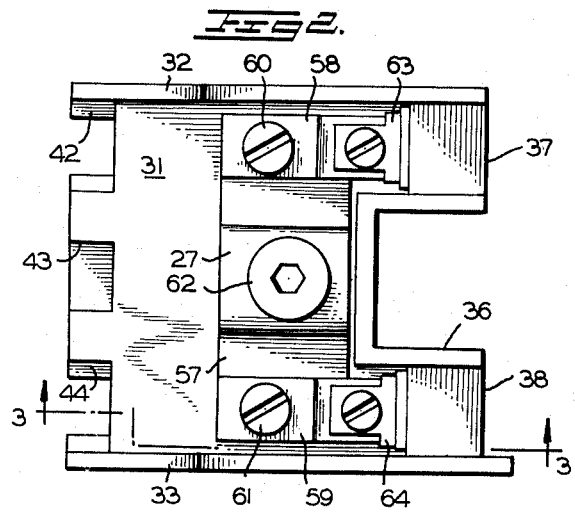
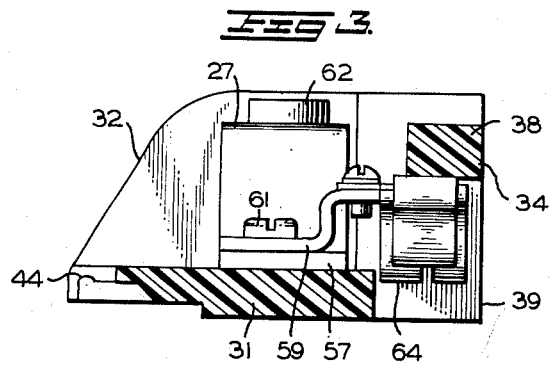
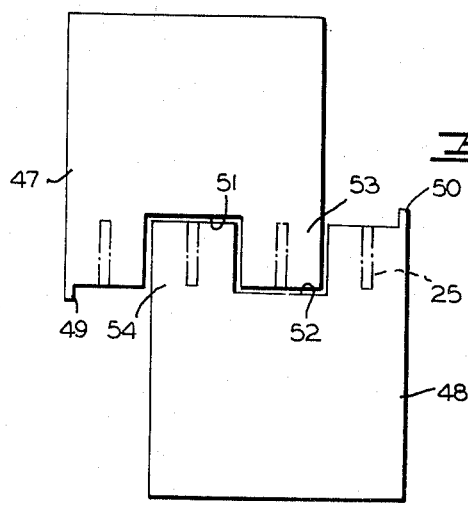
INVENTORS
LEWIS W. JACOBS,
ROBERT J. SABATELLA
BY Robert T. Casey
ATTORNEY

United States Patent Office 3,128,142
Patented Apr. 7, 1964

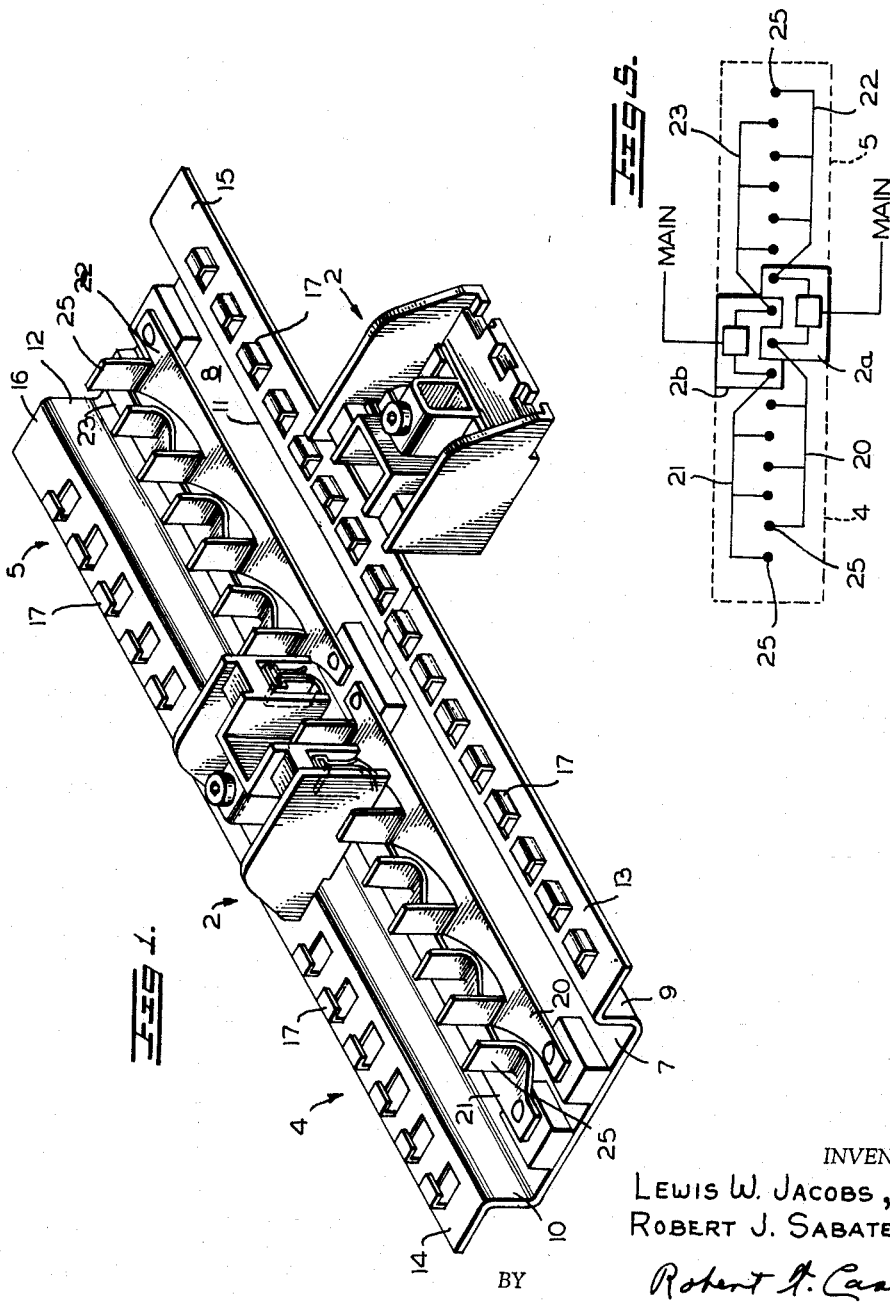

3,128,142
CABLE CONNECTOR FOR PLUG-IN PANEL
Lewis W. Jacobs, West Hartford, and Robert J. Sabatella, Southington, Conn., assignors to General Electric Company, a corporation of New York
Filed Mar. 29, 1962, Ser. No. 183,634
2 Claims. (Cl. 339—198)

The present invention relates to an electrical power cable connector assembly for use with plug-in type panel assemblies known variously as panelboards and load centers.

Plug-in circuit breakers have found particular use in various panelboard arrangements as circuit control means for branch circuits that originate at the panelboard arrangement. Each panelboard generally has one or more bus bars secured thereto with integral "main" lug terminal means for each bus bar that is adapted to receive an electrical input power cable for the individual bus bar. The plug-in circuit breakers, when removably secured to the panelboard arrangement and to the desired bus bar, provide the necessary switch control of output power from the desired bus bar to the branch circuits which are connected to suitable line terminal taps on the desired circuit breaker. A panel arrangement of the general type referred to is shown, for example in Patent No. 2,738,446, Fleming, assigned to the same assignee as the present invention.

In such panels, the size limitations of the main lug terminal means limits the input power to the individual bus bars. Additionally, the fixed lug terminal means that are secured to the individual bus bars do not permit connecting the electrical power cables at any other point on the bus bars.

In a particular form of panelboard arrangement as shown in application Serial No. 180,540, assigned to the same assignee as the present invention, a "split" panelboard arrangement is provided, having end-to-end bus bar assemblies, each including a pair of bus bars and insulated from each other. Means is also provided for feeding such pairs of bus bars in electrical parallel manner from a single pair of incoming cables.

In the structure shown in the aforementioned application, plug-on connector blocks have been used, of the type shown in application S.N. 181,935, Johnson, assigned to the same assignee as the present invention.

Such blocks are mounted on the blades near the adjacent ends of the bars, and provide an individual connecting terminal for each blade. The current-carrying capacity of a feed-in cable, however, is ordinarily greater than the current-carrying capacity of a single panel blade. If it is desired to use such connectors as a main power input to a panel, therefore, it is necessary, to connect conductors of a first size to each of said terminals, and then to unite such conductors in pairs such as by splicing or by use of additional junction-blocks, to connect to the two larger incoming power cables. This is relatively inconvenient and expensive, and requires use of more wiring space than is desirable.

Accordingly, it is an object of the present invention to provide a new and improved plug-in cable connector assembly for use with a plug-in type panelboard arrangement that is capable of providing means for connecting a conductor thereto which is of a higher capacity than that of a single plug-in contact of said panel.

An additional object of the present invention is to provide a new and improved plug-in cable connector assembly that will facilitate the direct connection of electrical power cables to corresponding pairs of non-adjacent blades of an electric panelboard.

In accordance with the invention, a plug-in cable connector assembly is provided, having an insulating base with at least one pair of spaced apart contacts secured to the base and adapted to engage corresponding spaced contacts of a panel. Terminal means is secured to the base to receive an electrical power cable, and means is provided on the base electrically connecting the single terminal connector to both of said contact means. The assembly base is also provided with a means for removably engaging a retaining means of the panelboard whereby the plug-in cable connector assembly may be removably secured to the panelboard arrangement by the retaining means and the contacts.

In accordance with the invention in one form, the resilient contact means are mounted at projecting, spaced-apart portions of the insulating base. The recess provided between the spaced apart portions is such that two of such assemblies can be mounted in interleaved or nesting arrangement from opposite sides of a panel.

The organization and operation together with further objects and advantages of the invention may best be understood by reference to the following description taken in connection with the accompanying drawings, in which:

FIGURE 1 is a perspective view of a pair of cable connector assemblies incorporating the invention, one assembly being shown in fully mounted position on one form of panel, and the other assembly being shown in dismounted position;

FIGURE 2 is a plan view of the new and improved plug-in cable connector assembly of the present invention;

FIGURE 3 is a sectional view along the line 3—3 of FIGURE 2;

FIGURE 4 is a silhouette plan view of the new and improved plug-in cable connector assembly of the present invention showing the engagement made possible by two of such assemblies when positioned on adjacent contact blades shown in phantom; and FIGURE 5 is a schematic representation of the electrical connections for the new and improved plug-in cable connector assemblies such as shown by FIGURE 4 when mounted upon one form of a panelboard arrangement such as shown by FIGURE 1.

Referring to FIGURE 1, a split panelboard arrangement is shown which has use with the new and improved plug-in cable connector assembly 2 of the present invention. The split panelboard arrangement has adjacent single panelboards 4 and 5 which are joined in tandem or in an end-to-end relationship so that a continuous channel member or panelboard arrangement is formed. The panelboards 4 and 5 are mechanically linked to each other while at the same time the bus bars thereof are electrically insulated from each other. The panelboards 4 and 5 are formed to define bottom walls 7 and 8 respectively with generally upwardly extending side walls 9–12 associated therewith. The side walls 9–12 are formed to define outwardly extending flanges 13–16 respectively which individually have a plurality of spaced apart retaining hooks 17 formed therein. A pair of generally parallel bus bars 20 and 21 are secured to and electrically insulated from the bottom wall 7 of the panelboard 4. Bus bars 22 and 23 are secured in a similar fashion to the bottom wall 8 of the panelboard 5. The bus bars 20–23 have a plurality of spaced apart contact blades 25 that are interleaved to define a generally aligned row of contact blades 25 positioned along or generally parallel to the longitudinal axis of the panelboard arrangement. In this connection, reference may be made to FIGURE 5 of the drawings for a better illustration of the mechanical and electrical dispositions of the interleaved contact blades 25.

The plug-in cable connector assembly 2 as shown by FIGURES 2 and 3 comprises a one-piece molded member of insulating material having a bottom wall 31 with upwardly extending side walls 32 and 33. The upwardly extending side walls 32 and 33 complement a rear wall 34 to form a generally U-shaped wall area that is open at one end. The rear wall 34 is generally formed to provide a central channel 36 that extends traverse to the bottom wall 31, and rear wall extensions 37 and 38. The channel 36 has a width greater than the width of the widest individual rear wall extension 37 and 38. The rear wall 34 is further formed to provide recesses such as 39 in the respective rear wall extensions 37 and 38. The bottom wall 31 is suitably formed along the open edge of the connector assembly 2 to define a plurality of spaced recess slots or notches 42-44 which are adapted for engagement with retaining means such as the retaining hooks 17 formed on the outwardly extending flanges 13-16 of the panelboard arrangement shown by FIGURE 1 and previously described.

FIGURE 4 shows the particular use realized by the configuration of the rear wall 34 when two plug-in cable connector assembly members 47 and 48 of the invention are positioned with abutting rear walls 49 and 50 respectively staggered or offset so that the respective channels 51 and 52 receive an associated rear wall extension 53 and 54 of the other assembly. The engagement of the rear walls 49 and 50 provides for a desired engagement of alternate contact blades 25 shown in phantom to be later described in more detail.

An electrically conductive strap 57 is secured to the bottom wall 31 and maintains electrical continuity between a lug terminal 27 that is centrally positioned thereon. Conductor straps 58 and 59 are positioned on either side of the lug terminal 27 and are electrically secured to the strap 57 by any suitable means such as screws 60 and 61. The lug terminal 27 has a suitable securing means 62 adapted to secure an electrical power cable, not shown, within the lug terminal 27. Each of the conductor straps 58 and 59 engages respective spring grip contact means 63 and 64 positioned within the slots or recesses such as 39 that are formed in the rear wall 34. The spring grip contact means 63 and 64 are adapted to engage and secure in electrical continuity the plug-in cable connector assembly 2 to alternate ones of the contact blades 25 of the panels as previously described.

The plug-in cable connector assembly 2 of the present invention is shown removably secured to the split panelboard arrangement of FIGURE 1, but it should be understood that the cable connector assembly 2 can have use with other forms of panelboard arrangements. The cable connector assembly 2 is removably secured to alternate contact blades 25 at an intermediate point on the split panelboard arrangement of FIGURE 1 so that the electrically insulated panelboards 4 and 5 are joined in a parallel connection by the contact blade 25 of the bus bar 21 and the contact blade 25 of the bus bar 23.

The plug-in cable connector assembly 2 may be removably secured as shown by FIGURE 1 as a bridging member for parallel connection to the panelboard arrangement as previously discussed or the plug-in cable connector assembly 2 may be removably secured at any location along the panelboard arrangement dependent only upon design parameters. Similarly, if a single panelboard is being used, the plug-in cable connectod assembly 2 may be positioned at any location along the individual panelboard. The plug-in cable connector assembly 2 provides that every other contact blade 25 of adjacent bus bars, in a panel such as shown by FIGURE 1 with interleaved contact blades 25, is engaged, such blades being at the same electrical potential, as compared to the differing potential of adjacent blocks. The engagement of every other contact blade 25 by the improved cable connector assembly 2 provides a higher power capacity input to an individual bus bar than would otherwise be possible by plug-in connection. For example, 100 ampere line current can be connected to each plug-in cable connector assembly 2 which divides into two 50 ampere paths to the alternate contact blades that are associated with the same bus bar. Thus the panel illustrated in FIGURE 1 has a total capacity of 200 amperes. Alternatively, a higher power output from an individual bus bar is also possible with the plug-in cable connector of the invention.

When a plug-in cable connector assembly in accordance with the invention is positioned on a "split" panelboard arrangement such as shown by FIGURE 1, with a similar plug-in cable connector assembly so that the abutting rear walls interengage as shown in silhouette by FIGURE 4, the schematic representation of the resulting electrical connection is shown by FIGURE 5. The plug-in cable connector assembly designated as 2a in the schematic diagram provides a bridging means between associated bus bars 20 and 22 of the juxtaposed panelboards 4 and 5, so that a parallel feed to the bus bars 20 and 22 is provided from the lug terminal 27. Similarly, the plug-in cable connector assembly 2b provides a bridging means between associated bus bars 21 and 23 of the panelboards 4 and 5 for parallel feed thereto.

It will be noted that each resilient contact 63, 64 engages the full width of the corresponding panel contact blades. If it were not for the general U-shaped configuration of the base, therefore, access to the intermediate blade would be prevented.

It will also be observed that the use of two such bases as illustrated which provide for feeding alternate bars from opposite sides of the panel makes possible use of a base which is 3 times the width of the center-to-center spacing of the contact blades of the panel. This is important, since conventional spacings of such blades (1-inch) are such that a 100-ampere capacity terminal connector such as 27, with its required insulating shielding, could not be mounted within the spacing of a single pair of blades of such a panel.

While a particular form of the invention has been shown, it is contemplated that modifications thereof may readily be made by those skilled in the art and it is intended therefore that the appended claims shall cover such modifications as fall within the true spirit and scope of the invention.

What we claim as new and desire to secure by Letters Patent of the United States is:

1. For use with an electric panel assembly having a plurality of electrical bus bars and a row of plug-type stationary electrical contacts, each of said contacts being connected to one of said bus bars, and retaining means in spaced relation to each of said stationary plug-type contacts, a cable connector assembly comprising:

(a) an insulating body having a base portion and parallel opposed upstanding side wall portions;
   (b) a screw type electric cable connector carried by said base between said opposed side walls adjacent one end of said body;
   (c) a pair of spaced apart socket-type electrical connectors carried by said base between said opposed side walls adjacent the other end of said body;
   (d) said insulating body including a generally U-shaped wall in the space between said plug-type connectors, the space within said U-shaped wall being open from front to back of said body.
   (e) means connecting said cable connector to each of said socket-type connectors, and
   (f) means carried by said insulating body and cooperable with said retaining means whereby said insulating body may be engaged with said retaining means and pivoted thereabout into plugged-in electrical engagement with said stationary plug-type contacts;
   (g) the transverse dimension of said space within said U-shaped wall being greater than the corresponding dimension of said insulating body at either side thereof, whereby said insulating body may be mounted in nested relation with another similar insulating body mounted on said panel assembly from the opposite side thereof.

2. A plug-in type panel assembly comprising:
(a) an elongated support;
(b) a first pair of elongated bus bars mounted in substantially parallel spaced relation on said support;
(c) a second pair of elongated bus bars mounted in parallel spaced relation on said support in substantial alignment with said first pair of bus bars, said second pair of bus bars having the ends thereof spaced a short distance longitudinally from corresponding ends of said first pair of bus bars;
(d) a row of mechanical retaining means carried by said elongated support at each side of said bus bars respectively and extending substantially parallel thereto;
(e) a plurality of contact blades each mechanically and electrically connected to one of said bus bars, said contact blades being spaced apart a predetermined modular distance and disposed in a row parallel to and substantially mid-way between said bus bars;
(f) a first cable connector assembly comprising a body of insulating material including a base and opposed side wall portions substantially perpendicular thereto at opposite sides thereof;
(g) a single clamp type cable connector carried by said insulating body between said side walls adjacent one end of said body;
(h) a pair of socket type electrical connectors carried by said insulating body each adjacent one of said opposed side walls and adjacent the other end of said body;
(i) said insulating body having a portion between said socket type connectors cut-away to provide a recess;
(j) said insulating body having a generally U-shaped barrier integral therewith surrounding said recess between said socket type connectors;
(k) means carried by said insulating body adjacent said one end for cooperation with said mechanical retaining means on said panel support;
(l) said socket type electrical connectors being spaced apart a distance substantially equal to two times the said predetermined modular spacing of said contact blades;
(m) whereby said insulating body may be engaged with said mechanical retaining means and pivoted thereabout and said socket type connectors brought into plugged-in engagement with a first non-adjacent pair of said contact blades, and
(n) a second connector assembly substantially identical to said first connector assembly mounted on said panel support and having a pair of socket type electrical connectors in engagement with a second non-adjacent pair of said contact blades, one blade of said second non-adjacent pair of contact blades lying between said first pair of non-adjacent contact blades.

References Cited in the file of this patent

UNITED STATES PATENTS

| | | |
|---|---|---|
| 1,203,582 | Chase | Nov. 7, 1916 |
| 1,641,265 | Gaynor | Sept. 6, 1927 |
| 2,003,948 | Mess | June 4, 1935 |
| 2,646,485 | Cole | July 21, 1953 |
| 2,707,761 | Page | May 3, 1955 |
| 2,725,544 | Strange | Nov. 29, 1955 |
| 2,738,473 | Johnson | Mar. 13, 1956 |
| 2,780,790 | Hubbell | Feb. 5, 1957 |
| 2,786,162 | Ballou | Mar. 19, 1957 |
| 2,897,410 | Hammerly | July 28, 1959 |
| 2,910,630 | Hammerly | Oct. 27, 1959 |
| 3,002,130 | Scott | Sept. 26, 1961 |